L. R. NELSON.
HOSE CONNECTOR OR COUPLING AND PROCESS OR METHOD FOR MAKING SAME.
APPLICATION FILED MAY 20, 1918.
1,321,324.
Patented Nov. 11, 1919.
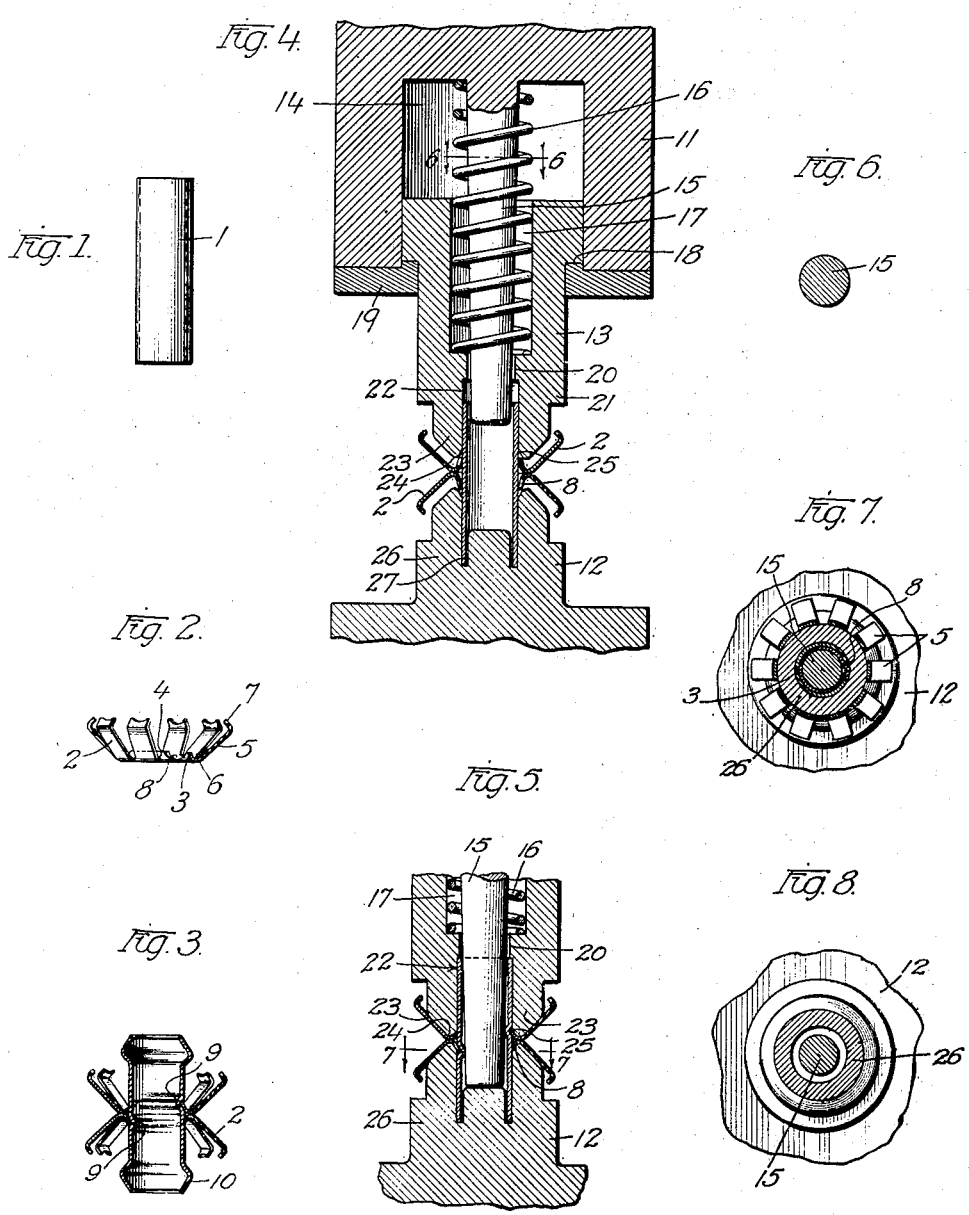

UNITED STATES PATENT OFFICE.

LEWEN R. NELSON, OF PEORIA, ILLINOIS.

HOSE CONNECTOR OR COUPLING AND PROCESS OR METHOD FOR MAKING SAME.

1,321,324.     Specification of Letters Patent.     Patented Nov. 11, 1919.

Application filed May 20, 1918. Serial No. 235,490.

*To all whom it may concern:*

Be it known that I, LEWEN R. NELSON, a citizen of the United States, residing at Peoria, in the county of Peoria and State of Illinois, have invented certain new and useful Improvements in Hose Connectors or Couplings and Processes or Methods for Making Same, of which the following is a specification.

My invention relates to improvements in hose connectors or couplings and in the process or method of making the same. These are devices for connecting or adjoining the ends of sections of hose, or for connecting the ends of a broken hose together, or for attaching the end of a hose to the standard hose coupling used for coupling the hose to a faucet, pipe, or the like, or connecting hose sections together, or other similar purposes.

The principal object of this invention is the provision of such a device and the process or method of making the same whereby a simple and strong article of the type described, may be readily made, the parts of which are properly formed and securely held together so as to obviate the possibility of separation or breakage, resulting in the giving of inefficient service.

To the accomplishment of the foregoing and such other objects as may hereinafter appear, my invention consists in the article and the process or method hereinafter described and then defined in the appended claims, reference being had to the accompanying drawing forming a part hereof and which shows one form of the device made according to my process or method, and also one manner of carrying out the improved process or method, it being expressly understood, however, that various changes may be made in the device itself and that the steps or operation of the process or method, may be varied in practice, within the scope of the claims, without digressing from my inventive idea.

In the drawings

Figure 1 represents an elevational view of the tubular blank which forms the connecting member in a completed device.

Fig. 2 is an elevational view partly in section of one of the hose engaging members before application, and securing to the tubular blank.

Fig. 3 is a longitudinal sectional view through a completed article embodying my invention and made according to my improved process or method.

Fig. 4 is a longitudinal vertical section through the die member, used in forming my new article and in carrying out my improved process or method, a tubular blank and the pair of hose engaging members being shown in the position assumed just before the forming and securing operation is begun.

Fig. 5 is a view similar to Fig. 4, of the forming parts and the article, after the forming and securing operation is completed, and before the forming parts are withdrawn.

Fig. 6 is a transverse cross section through the mandrel or core, taken substantially on line 6—6 of Fig. 4.

Fig. 7 is a transverse cross section taken substantially on line 7—7 of Fig. 5 to more clearly illustrate the manner in which the hose-engaging members are locked and secured to the tubular blank.

Fig. 8 is a transverse cross section taken substantially on line 7—7 of Fig. 5, the tubular blank and hose engaging member being removed.

As stated hereinbefore, this invention has reference to that class of devices which are known as hose connectors or hose couplings, and particularly to that type of device which has the tubular connecting member having hose engaging members provided thereon, which hose engaging members include bendable fingers which are adapted to be driven into the hose to make a permanent and secure connection, as disclosed in my prior Patents No. 946,703, January 18, 1910, and No. 1,051,621, January 28, 1913, and also in my copending application Serial No. 93,082.

In the manufacture of these devices the tubular blanks used for the connecting members are either drawn or spun or else are welded, the former being the "seamless" blank and the latter having the seam welded. The use of the welded blanks results frequently in the forming of defective connectors, due to splits and other defects along the seams. This is due to the fact that previously in the manufacture of devices of this character the tubular blanks were swelled or forced outwardly on each side of the flanges of the hose engaging members, so that the latter would fit more or less tightly in a sort of depression. As the welded blanks are considerably cheaper than the seamless blanks, the consequent use of the seamless blanks has necessarily increased the expense of manufacture, as the manufacturers have been unable to use successfully the welded blanks.

However in manufacturing these articles according to my improved process or method, the welded blanks may be used just as successfully as the seamless blanks so that the cost of manufacture is materially reduced. In this new process the blanks have a diameter of maximum size and the hose engaging members are pressed or pinched inwardly for the purpose of securing or fixing them to the tubular blank, thereby materially reducing the possibility of the making of defective articles. In addition, part of the flange of the hose engaging member is cut out, so that when this flange is pinched or pressed inwardly, a small part of the tubular blank will remain in its original position and due to the fact that the tubular blank is contracted for substantially its full circumference with the exception of this small part, this small part will stand out as a sort of lug or projection fitting in the cut out part of the flange of the hose engaging member. As the engagement of these parts is quite tight, the hose engaging members are thus securely locked or held in position on the tubular blank against movement longitudinally of the blank, or rotation relative to the blank.

Referring now to the drawings, the numeral 1 designates the tubular blank which forms the connecting member in the completed article, the numeral 2 designates the hose engaging member which has the collar or sleeve portion 3 terminating in the inturned lip or flange 4 which is circular in shape and extends inwardly at an angle to the longitudinal line of the tubular blank, Each hose engaging member is also formed with the rearwardly and outwardly extending fingers or lugs 5 which merge into the curved end surface or portion 6 thereof. These lugs or fingers 5 have the bent engaging ends 7, which when the fingers or lugs are driven down, will be driven into the hose.

It is to be noted referring particularly to Fig. 2 that I provide a comparatively small cut-out portion in the inturned flange part 4, this cut out portion being designated by the reference character 8.

As seen from the completed article, in Fig. 3, the lip or flange 4 is pressed or pinched inwardly to bite into the tubular connecting member 1, as at 9. In its original form the hose engaging member slides loosely over the tubular blank, so that the parts may be readily assembled, prior to the securing operation. This pressing or pinching inwardly of the lip or flange 4 forces part of the tube 1 inwardly, forming a slight depression there-around, but in view of the provision of the cut out portion in the lip or flange 4, a small part of the tubular blank remains at its original size, and is not pressed inwardly but forms a projection or lug 10 extending into the cut out portion of the flange and against which the ends or edges of the cut out portion of the flange engage. By this means the hose engaging members are securely held in position on the tubular blanks and both against movement longitudinally of the tubular blanks and also rotation relative to the tubular blanks. The beads or heads 11 are formed thereafter.

The method or process of making this article is illustrated particularly in Figs. 4 and 5, to which reference will now be made, the former showing the tubular blanks and the hose engaging member, before operation, and the latter showing them after the operation is complete, both views showing one form of mechanism for carrying out this process or method.

The numeral 11 designates the upper die and the numeral 12 the lower die or anvil. The upper die has the forming member or plunger 13 slidably mounted in a socket 14 and embracing the post member 15 which forms a mandrel or core coöperating therewith. The spring 16 embraces said post 15 and extends within the socket 17 in the forming member or plunger 13, so as to normally hold the same in the position shown in Fig. 4, due to its engagement with the shoulder formed on the inside of the bore or aperture through the forming member or plunger 13. This forming member or plunger 13 has the external shoulder 18 to engage the abutment member 19 to limit its outward or downward movement. It is also provided with the restricted passage 20 through which the post or mandrel 15 passes and also has the forming head 21 which is provided with the socket 22, the internal diameter of which socket corresponds to the external diameter of the tubular blank so as to receive the same therein. This forming head 21 has the outer surface of its end portion beveled, as at 23, up to the rounded end edge 24, the inner surface also being beveled, as at 25, and merging into the rounded end edge 24. The diameter of the annular rounded end edge 24 is slightly greater than the diameter of the annular lip or flange 4 of the hose engaging member, as clearly indicated in Fig. 4.

The lower die or anvil member 12 is provided with a similarly shaped forming head 26, which is stationary and has a socket 27 to receive the tubular blank 1. The post 15 which forms the core or mandrel member is circular for the greater portion of its length and is adapted to fit within the tubular blank. It is to be noted that the forming head 26 is of the same size and shape as the forming head 21 which was previously described in detail.

The method or process of manufacturing these articles is as follows: A blank 1 with a pair of oppositely disposed hose engaging members 2 is placed on the lower die or anvil member 12. The upper die member is caused to descend and moves to the position shown in Fig. 4, when, due to the engagement of the rounded edge 24, with the flange or lip 4 of the upper hose engaging member 2, the forming member or plunger 13 will remain stationary, the spring 16 being compressed, as is well understood. This results in the core or mandrel member 15 continuing to descend and to pass through the tube 1. The rear end of the socket 14 then engages the forming member or plunger 13 and positively forces the same downwardly. This results in the downward movement of the forming head 21 which, due to the beveled inner face 25, engaging the flange or lip 4 of the upper hose engaging member, forces the same inwardly, causing it to press or bite into the tubular blank. This movement also causes a corresponding inward movement of the flange of the lower hose engaging member, due to its engagement with the inner sloping surface of the forming head 26, as clearly shown in Fig. 5 of the drawings.

It is to be noted that the diameter of the core or mandrel member 15 is slightly less than the diameter of the tubular blanks, so as to permit the material of the tubular blanks to be forced inwardly. Due to the cut out portion of the flange of the hose engaging member, a small part of the material of the tubular blank remains at its original size or diameter and fits within this cutout portion of the flange forming a projection or lug, as previously described and thereby securely locking the parts together.

It is therefore seen that in manufacturing these articles, according to this process, at no time is the tubular blank subjected to an expanding force but it is only subjected to a pressure inwardly or a contracting force over two restricted areas. This will necessarily materially decrease the possibility of forming defects in a tubular blank which would result in leakage and the giving of inefficient service.

Attention is particularly directed to the fact that devices made by this method are free from any possibility of lateral rotation of the hose engaging member relative to the tubular blank or connecting member. They are securely locked against this movement and as this movement is frequently the cause of considerable leakage in former devices of this kind, this is a very important feature of this invention. As the engagement of the part is very tight and as this lug or projection has a tight fit in the cut out portion of the flange of the hose engaging member, this relative movement is positively prevented.

Having described my invention, what I claim is:—

1. The herein described method of making devices of the character described, which consists in providing a tubular blank and also an engaging member, said engaging member having an aperture therethrough to receive said tubular blank and also having a comparatively small cut out portion, and pressing portions of said engaging member inwardly to bite into said tubular blank to compress the same, said cut out portion permitting a small portion of the tubular blank to retain its original position and size, and thus form a lug or projection fitting in said cut out portion of the engaging member to lock the parts against relative rotation.

2. The herein described method of making devices of the character specified, which consists in providing a tubular blank of the maximum required diameter and also an engaging member having an aperture therethrough so as to fit on said tubular blank and also having a flange portion adapted to embrace said tubular blank, providing a cut out portion in said flange portion, and pressing portions of said flange portion inwardly to bite into and compress said tubular blank, said cut out portion of the flange portion permitting a small part of the tubular blank to retain its original position and size and thus form a lug or projection fitting in said cut out portion.

3. The herein described method of making hose connectors or couplings which consists in providing a tubular blank and also a hose engaging member, said hose engaging member being provided with an aperture so as to fit on said tubular blank and having a flange portion adapted to embrace said tubular flange, providing a cut-out portion in said flange portion, and pressing said flange portion inwardly to bite into and compress said tubular blank, said cut out portion permitting a small portion of the tubular blank to retain its original position and size and thus form a lug or projection fitting in said cut out portion of the flange.

4. A device of the character described including in combination, a tubular connecting member, having an engaging member secured thereon, said engaging member having portions forced into and compressing said tubular connecting member and also having a cut out portion to receive a lug or projection formed by the non-compressed part of said tubular member to prevent relative rotation between the parts.

5. A device of the character described including in combination, a tubular connecting member, an engaging member having an aperture therethrough and an annular flange surrounding said aperture, said annular flange being formed with a comparatively small cut out portion and being pressed inwardly biting into and compressing said tubular connecting member, the part of said tubular connecting member registering with said cut out portion of the flange retaining its original size and thus forming a projection fitting in said cut out portion to prevent relative rotation of the parts.

In testimony whereof I hereunto set my hand.

LEWEN R. NELSON.